(12) United States Patent
Dowd et al.

(10) Patent No.: US 9,104,008 B2
(45) Date of Patent: Aug. 11, 2015

(54) OPTICAL FIBER COATING TO PREVENT ADHESION AT HIGH TEMPERATURES

(75) Inventors: Edward M. Dowd, Madison, CT (US); John J. Grunbeck, Northford, CT (US); Domino Tavemer, Wallingford, CT (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 1166 days.

(21) Appl. No.: 12/730,841

(22) Filed: Mar. 24, 2010

(65) Prior Publication Data

US 2011/0235984 A1    Sep. 29, 2011

(51) Int. Cl.
*G02B 6/44* (2006.01)
*E21B 47/12* (2012.01)
*G02B 6/02* (2006.01)

(52) U.S. Cl.
CPC ............ *G02B 6/4488* (2013.01); *E21B 47/123* (2013.01); *G02B 6/443* (2013.01); *Y10T 29/49885* (2015.01)

(58) Field of Classification Search
None
See application file for complete search history.

(56) References Cited

U.S. PATENT DOCUMENTS

| | | | |
|---|---|---|---|
| 4,711,388 A * | 12/1987 | Winter et al. | 228/148 |
| 6,067,394 A | 5/2000 | Ruello et al. | |
| 6,404,961 B1 * | 6/2002 | Bonja et al. | 385/109 |
| 6,442,304 B1 * | 8/2002 | Crawley et al. | 385/12 |
| 7,024,081 B2 | 4/2006 | Dowd et al. | |
| 7,155,101 B2 * | 12/2006 | Shah et al. | 385/128 |
| 7,218,820 B2 * | 5/2007 | Maida, Jr. | 385/100 |
| 7,424,190 B2 * | 9/2008 | Dowd et al. | 385/109 |
| 7,646,953 B2 * | 1/2010 | Dowd et al. | 385/109 |
| 7,805,046 B2 * | 9/2010 | Dowd | 385/139 |
| 8,111,960 B2 * | 2/2012 | Dowd et al. | 385/109 |
| 2004/0213529 A1 * | 10/2004 | Dowd et al. | 385/109 |
| 2005/0238309 A1 * | 10/2005 | Drenzek et al. | 385/128 |
| 2006/0182398 A1 * | 8/2006 | Dowd et al. | 385/100 |
| 2006/0215974 A1 | 9/2006 | Maida, Jr. | |
| 2008/0062036 A1 * | 3/2008 | Funk et al. | 342/22 |
| 2008/0247718 A1 * | 10/2008 | Dowd et al. | 385/113 |
| 2008/0273852 A1 | 11/2008 | Parker et al. | |
| 2010/0008632 A1 * | 1/2010 | Herbst | 385/109 |
| 2010/0142903 A1 * | 6/2010 | Dowd et al. | 385/109 |
| 2011/0088259 A1 * | 4/2011 | Dowd | 29/861 |
| 2011/0235984 A1 * | 9/2011 | Dowd et al. | 385/109 |

FOREIGN PATENT DOCUMENTS

| | | |
|---|---|---|
| GB | 2460918 | 12/2009 |
| JP | 11283139 | 10/1999 |
| JP | 11283139 A | 10/1999 |

(Continued)

OTHER PUBLICATIONS

European Search Report dated Aug. 3, 2011 for Application No. EP 11250364.

(Continued)

*Primary Examiner* — Rhonda Peace
(74) *Attorney, Agent, or Firm* — Patterson & Sheridan, LLP (57) ABSTRACT

Embodiments of the present invention provide methods and apparatus for cables having one or more fibers that may function as a sensing device within a wellbore, wherein the fibers do not adhere to each other or to an inner wall of the cable during a high temperature operation, such as in a thermal recovery operation that may last over 30 days.

2 Claims, 8 Drawing Sheets

(56) References Cited

FOREIGN PATENT DOCUMENTS

| | | |
|---|---|---|
| WO | WO2006114410 | 11/2006 |
| WO | WO2008051945 | 5/2008 |

OTHER PUBLICATIONS

Office Action dated May 28, 2014, issued by the Canadian Intellectual Property Office in corresponding Application No. 2,735,073.

* cited by examiner

OPTICAL FIBER COATING TO PREVENT ADHESION AT HIGH TEMPERATURES

BACKGROUND OF THE INVENTION

1. Field of the Invention

Embodiments of the present invention generally relate to cables for use in high temperature environments, such as downhole gas and oil well applications.

2. Description of the Related Art

Figure 1:
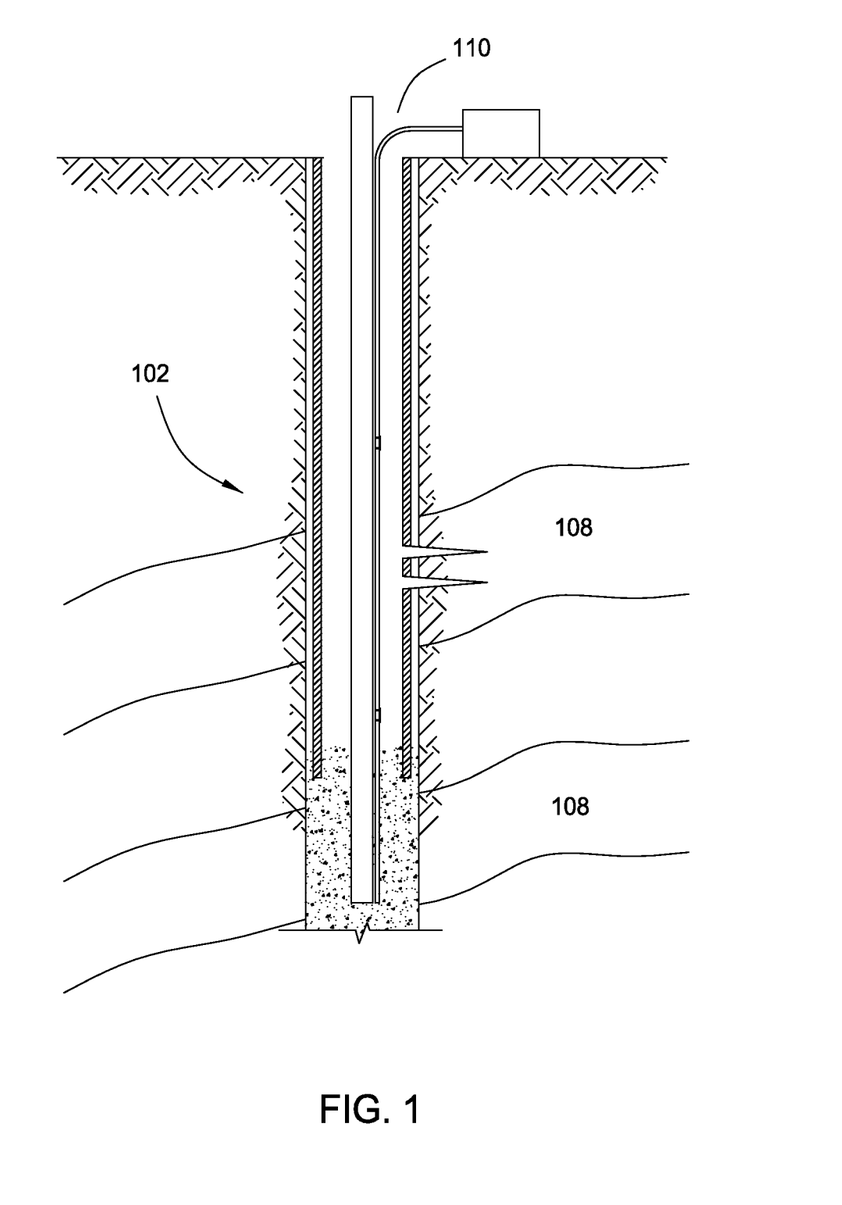
FIG. 1 is a schematic cross-sectional view of a wellbore, wherein a cable is provided as a sensing device within the wellbore, according to an embodiment of the present invention.

With advancements in the area of fiber optic sensors for use in harsh environments, there is an increasing need for fiber optic cables compatible with the harsh environmental conditions present in downhole oil and gas well applications. FIG. 1 illustrates a schematic cross-sectional view of a wellbore 102, wherein a cable 110 is provided as a sensing device within the wellbore 102. Properties of downhole formations surrounding or otherwise adjacent the wellbore 102 may be monitored over time based on measurements made by the sensing device. Further, hydrocarbon production may be controlled or reservoirs 108 may be managed based on the downhole formation properties.

Figure 1A:
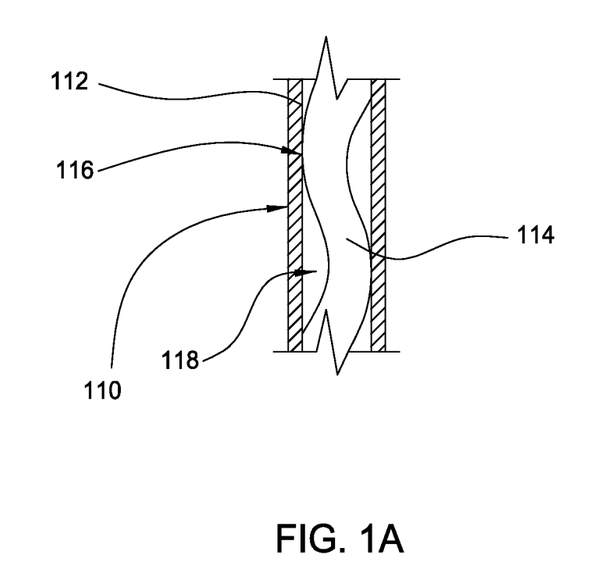
FIG. 1A is a partial sectional side view of the cable of FIG. 1, according to an embodiment of the present invention.

FIG. 1A illustrates a partial sectional side view of the cable 110. Cables used in high temperature operations, such as in a thermal recovery operation, may be made by introducing excess fiber length (EFL) to avoid tension on the one or more fibers 114 at high temperatures due to thermal expansion of the cable components. The fibers 114 generally take on a sinusoidal and/or helical form inside the cable 110. As the fibers 114 and the cable 110 are not retained relative to one another, the sinusoidal orientation of the fibers 114 within the cable 110 may result in intermittent contact points 116 and gaps 118 therebetween.

During a thermal recovery operation, the EFL of the cable 110 may be reduced and coatings on the one or more fibers 114 may adhere at contact points with each other or to an inner wall of the cable 110 either through partial melting or chemical bonding of the coatings. Applications using Weatherford's standard downhole cables above 300 degrees Celsius may be near the melting point of the polyimide coatings used on the fibers. At 350 degrees Celsius, the coating on the fibers may become brittle. After a thermal recovery operation, which may last over 30 days, when the cable temperature may then be reduced, the cable structure contracts and the fibers 114 within the cable 110 may return to a state of increased EFL. If the fibers 114 are adhered with each other or to an inner wall of the cable 110, the fibers 114 may not return to their respective original orientations and tight bends may form along the fibers resulting in increased optical loss.

SUMMARY OF THE INVENTION

Embodiments of the present invention generally provide methods and apparatus for cables having one or more fibers, wherein the fibers do not adhere to each other or to an inner wall of the cable during a high temperature operation.

One embodiment of the present invention is a method. The method generally includes providing a tube plus one or more fibers, applying a high temperature rated substance to the one or more fibers, and deploying the one or more fibers into the tube to provide a cable, wherein the substance prevents the one or more fibers from adhering to each other or to an inner wall of the cable during a high temperature operation.

Another embodiment of the present invention is a method. The method generally includes providing a cable with one or more fibers, and filling the cable with a high temperature rated substance, wherein the substance prevents the one or more fibers from adhering to each other or to an inner wall of the cable during a high temperature operation.

Yet another embodiment of the present invention is a method. The method generally includes providing a cable with one or more fibers, and injecting a high temperature rated filler material into the cable, wherein the filler material fills void spaces within the cable surrounding the one or more fibers and prevents the one or more fibers from adhering to each other or to an inner wall of the cable during a high temperature operation.

Yet another embodiment of the present invention provides a cable suitable for a high temperature operation. The cable generally includes a tube, one or more fibers disposed in the tube, and a high temperature rated substance disposed over the one or more fibers, wherein the one or more fibers do not adhere to each other or to an inner wall of the cable during the operation.

Yet another embodiment of the present invention is a method. The method generally includes producing one or more fibers with a high temperature rated coating, and deploying the one or more fibers into a tube to provide a cable, wherein the coating prevents the one or more fibers from adhering to each other or to an inner wall of the cable during a high temperature operation.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for cables having one or more fibers that may function as a sensing device within a wellbore, wherein the fibers do not adhere to each other or to an inner wall of the cable during a high temperature operation, such as in a thermal recovery operation that may last over 30 days with temperatures at or exceeding about 200 degrees Celsius (e.g., at least about 250 or at least about 300 degrees Celsius).

Figure 2:
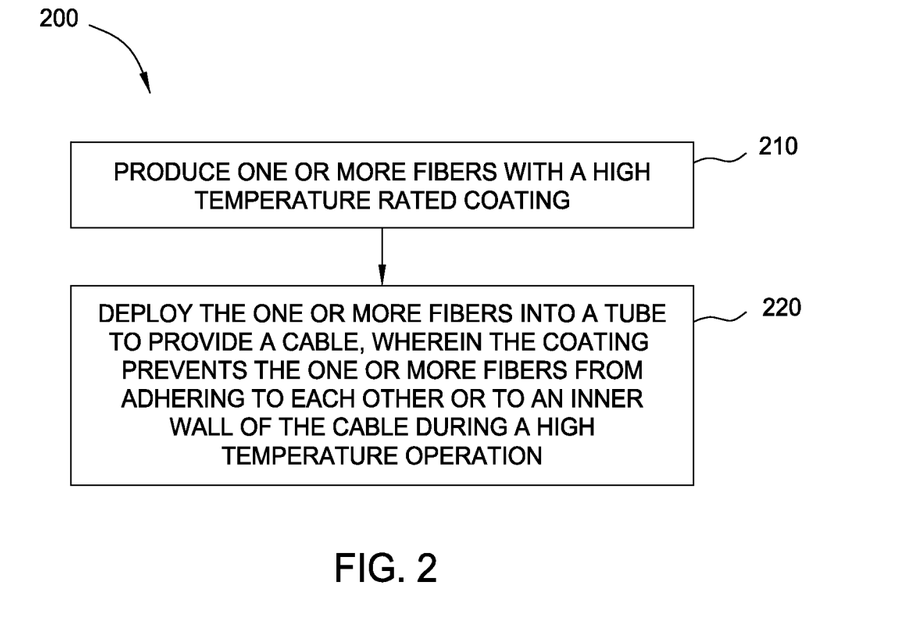
FIG. 2 is a flow diagram of exemplary operations for providing a cable with one or more fibers, wherein the one or more fibers are produced with a high temperature rated coating, according to an embodiment of the present invention.

FIG. 2 illustrates operations 200 for providing a cable with one or more fibers, wherein the one or more fibers are produced with a high temperature rated coating, according to embodiments of the present invention. At 210, one or more fibers may be produced with a high temperature rated coating. For some embodiments, the high temperature rated coating may be a highly-cured polyimide coating. When a polyimide coating is applied to optical fibers, the coating may undergo an imidization reaction, promoted by heat, to cure the polyimide. Traditionally, the polyimide coating may not have fully reacted during the fiber coating process. Unreacted sites in the coating may be a source of the coated fibers adhering to one another when further exposed to heat. For some embodiments, the highly-cured polyimide coating is one that is 100% or nearly 100% imidized (i.e., cured). Obtaining a highly-cured polyimide coating may be accomplished during the initial coating application with process adjustments (such as thermal dwell time and temperature) or in a post cure process using heat or infrared energy.

At 220, the one or more fibers with the high temperature rated coating may be deployed into a tube to provide a cable, wherein the coating prevents the one or more fibers from adhering to each other or to an inner wall of the cable during a high temperature operation, such as in a thermal recovery operation that may have temperatures at or exceeding about 200 degrees Celsius.

Figure 3:
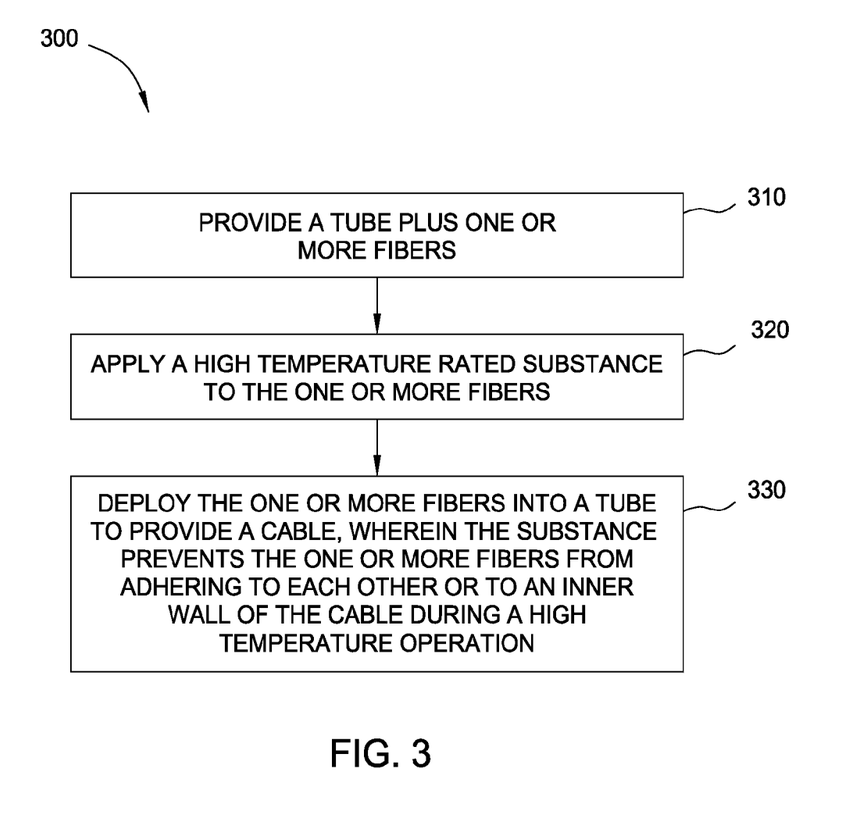
FIG. 3 is a flow diagram of exemplary operations for providing a cable with one or more fibers, wherein a high temperature rated substance is applied to the one or more fibers prior to cabling, according to an embodiment of the present invention.
Figure 4:
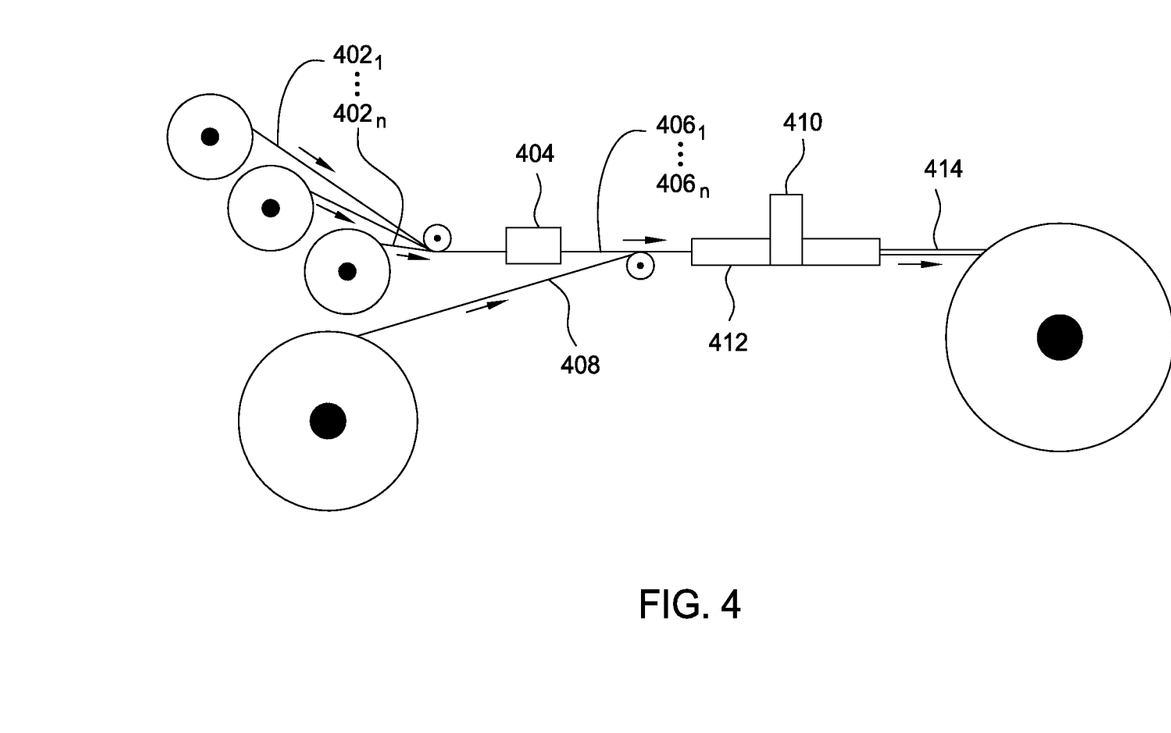
FIG. 4 illustrates a simplified schematic of a cable assembly line corresponding to the example operation shown in FIG. 3.

FIGS. 3-4 are a flow diagram and simplified schematic of operations 300 for providing a cable with one or more fibers, wherein a high temperature rated substance is applied to the one or more fibers prior to cabling, according to embodiments of the present invention. The reader is encouraged to refer to FIGS. 3-4 simultaneously. A tube 412 plus one or more fibers ($402_1 \ldots 402_n$) may be provided at 310. For some embodiments, the tube 412 may be formed from a metal strip stock 408.

At 320, the high temperature rated substance may be applied to the one or more fibers ($402_1 \ldots 402_n$) by an applicator 404. The high temperature rated substance may be at least a high temperature rated silicone oil, high temperature rated lubricant oil, a high temperature rated mold release agent, or the highly-cured polyimide coating. For some embodiments, the high temperature rated substance may be applied by a wetted sponge or cloth, or a fine spray type applicator and the like. For some embodiments, the high temperature rated substance may be applied by passing the one or more fibers ($402_1 \ldots 402_n$) through a bath of the high temperature rated substance and wiping the excess off. For some embodiments, the high temperature rated substance may be applied to the one or more fibers ($402_1 \ldots 402_n$) offline so that the spools of the one or more fibers may already have the substance applied.

At 330, the one or more fibers having the substance applied ($406_1 \ldots 406_n$) may be deployed into the tube 412 to provide the cable 414, wherein the high temperature rated substance prevents the one or more fibers ($406_1 \ldots 406_n$) from adhering to each other or to an inner wall of the cable 414 during a high temperature operation. For some embodiments, the one or more fibers ($406_1 \ldots 406_n$) may be sheathed in a seam welded tube 412 by a seam welder 410 to provide the cable 414.

Figure 5:
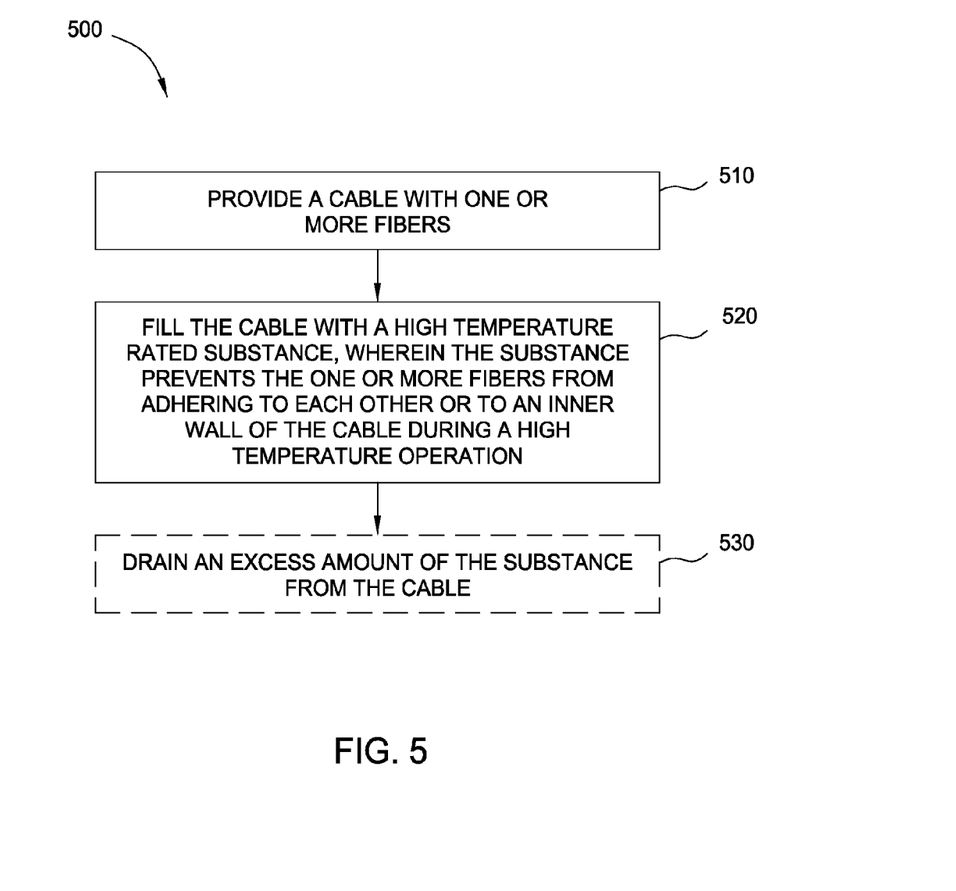
FIG. 5 is a flow diagram of exemplary operations for providing a cable with one or more fibers, wherein the cable is filled with a high temperature rated substance, according to an embodiment of the present invention.
Figure 7:
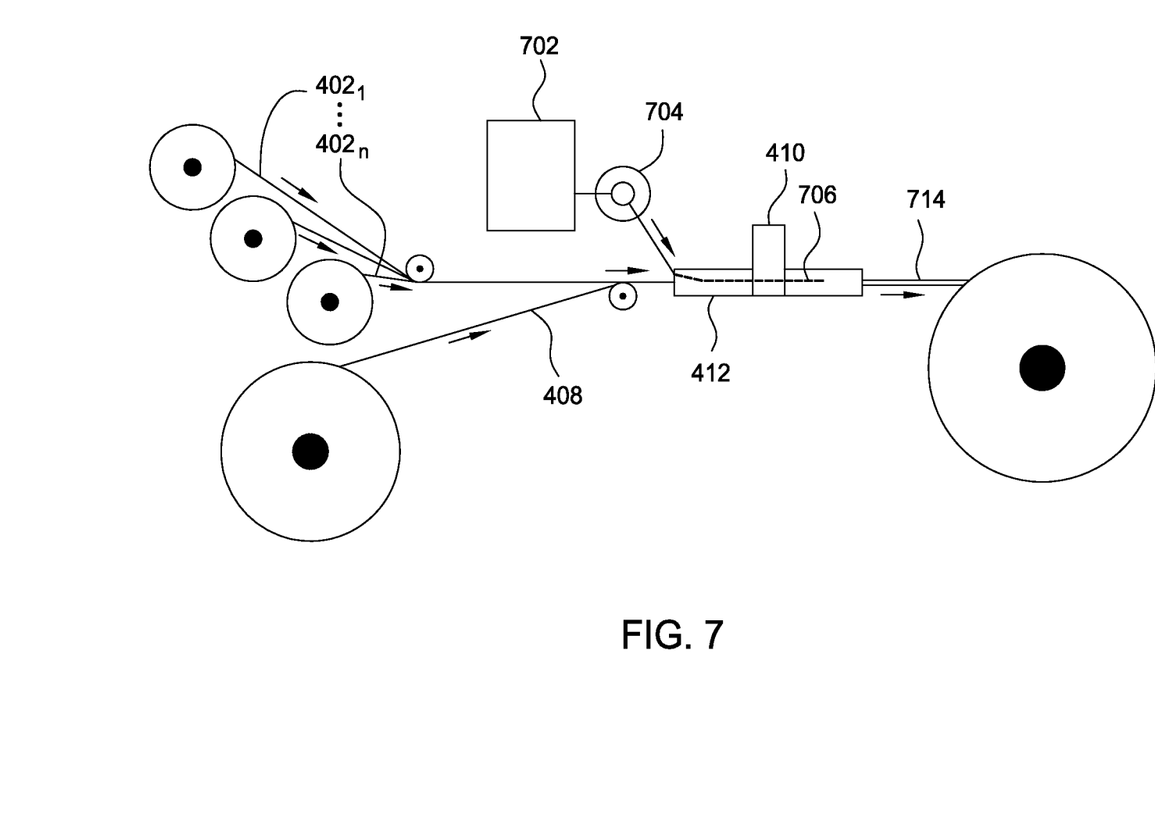
FIG. 7 illustrates a simplified schematic of a cable assembly line corresponding to example operations shown in FIGS. 5 and 6.

FIG. 5 illustrates operations 500 for providing a cable with one or more fibers, wherein the finished cable is filled with a high temperature rated substance, according to embodiments of the present invention. A cable with one or more fibers may be provided at 510. Referring to FIG. 7, for some embodiments, the one or more fibers ($402_1 \ldots 402_n$) may be sheathed in a seam-welded tube 412 by a seam welder 410.

At 520, the cable may be filled with a high temperature rated substance, wherein the substance prevents the one or more fibers from adhering to each other or to an inner wall of the cable 714 during a high temperature operation. The high temperature rated substance may be at least a high temperature rated silicone oil, high temperature rated lubricant oil, a high temperature rated mold release agent, or the highly-cured polyimide coating. For some embodiments, the high temperature rated substance may be fed through a hypodermic tube 706, which may run parallel to the cable. The high temperature rated substance may be contained in a reservoir 702 and fed through the hypodermic tube 706 by a metering pump 704. The substance may exit the tube 706 just downstream of the seam welder 410 as not to contaminate the welding process.

Since the coefficient of volume expansion for a liquid generally tends to be higher than for a solid, the cable may be filled with the high temperature rated substance to only 50%-75% capacity for some embodiments. Optionally, at 530, an excess amount of the high temperature rated substance may be drained from the cable. For some embodiments, the cable 714 may be loaded on a spool.

Figure 6:
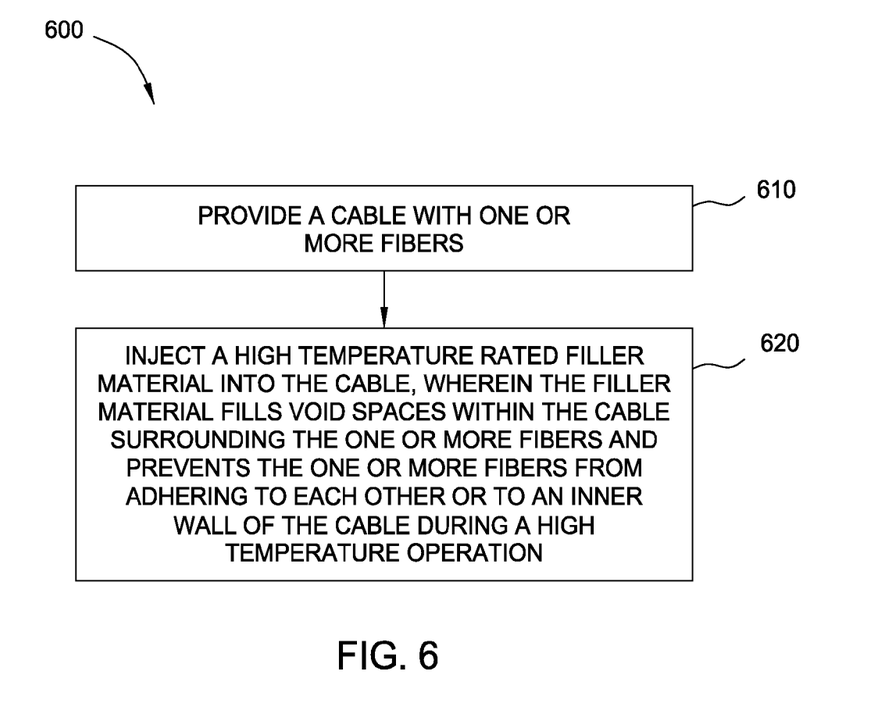
FIG. 6 is a flow diagram of exemplary operations for providing a cable with one or more fibers, wherein the cable is injected with a high temperature rated filler material, according to an embodiment of the present invention.

FIG. 6 illustrates operations 600 for providing a cable with one or more fibers, wherein the finished cable is filled with a high temperature rated filler material, according to embodiments of the present invention. A cable with one or more fibers may be provided at 610. Referring to FIG. 7, for some embodiments, the one or more fibers ($402_1 \ldots 402_n$) may be sheathed in a seam-welded tube by a seam welder 410. At 620, the cable may be filled with a high temperature rated filler material, wherein the filler material fills void spaces within the cable surrounding the one or more fibers and prevents the one or more fibers from adhering to each other or to an inner wall of the cable during a high temperature operation.

The filler material supports and prevents the one or more fibers ($402_1 \ldots 402_n$) from moving excessively within the cable 714. The filler material also prevents chaffing of the coatings on the one or more fibers ($402_1 \ldots 402_n$) as a result of bending action during installation and vibration of the cable 714. The filler material also serves to cushion the one or more fibers ($402_1 \ldots 402_n$) against the inner wall of the cable 714 to avoid microbend losses across cable bends.

For some embodiments, the high temperature rated filler material may be fed through a hypodermic tube 706, which may run parallel to the cable. The high temperature rated filler material may be contained in a reservoir 702 and fed through the hypodermic tube 706 by a metering pump 704. The filler material may exit the tube 706 just downstream of the seam welder 410 as not to contaminate the welding process. For some embodiments, the cable 714 may be loaded on a spool.

While the foregoing is directed to embodiments of the present invention, other and further embodiments of the invention may be devised without departing from the basic scope thereof, and the scope thereof is determined by the claims that follow.

The invention claimed is:
1. A method comprising:
   producing one or more fibers with a coating rated for a high temperature operation having a temperature above 300 degrees Celsius, wherein the coating is a highly-cured polyimide coating; and deploying the one or more fibers into a tube to provide a cable, wherein the coating prevents the one or more fibers from adhering to each other or to an inner wall of the cable during the high temperature operation.

2. A method comprising:

providing a cable with one or more fibers; and injecting a filler material into the cable, wherein the filler material is rated for a high temperature operation having a temperature above 300 degrees Celsius, wherein the filler material is a highly-cured polyimide coating, and wherein the filler material fills void spaces within the cable surrounding the one or more fibers and prevents the one or more fibers from adhering to each other or to an inner wall of the cable during the high temperature operation.

* * * * *

UNITED STATES PATENT AND TRADEMARK OFFICE
CERTIFICATE OF CORRECTION

| | | |
|---|---|---|
| PATENT NO. | : 9,104,008 B2 | Page 1 of 1 |
| APPLICATION NO. | : 12/730841 | |
| DATED | : August 11, 2015 | |
| INVENTOR(S) | : Dowd et al. | |

It is certified that error appears in the above-identified patent and that said Letters Patent is hereby corrected as shown below:

Title Page, (75) Inventors:

Please delete "Tavemer" and insert --Taverner-- therefor.

Signed and Sealed this
Fifth Day of January, 2016

Michelle K. Lee
*Director of the United States Patent and Trademark Office*